G. SCHREYER.
Thill-Coupling.
No. 65,017.
Patented May 21, 1867.
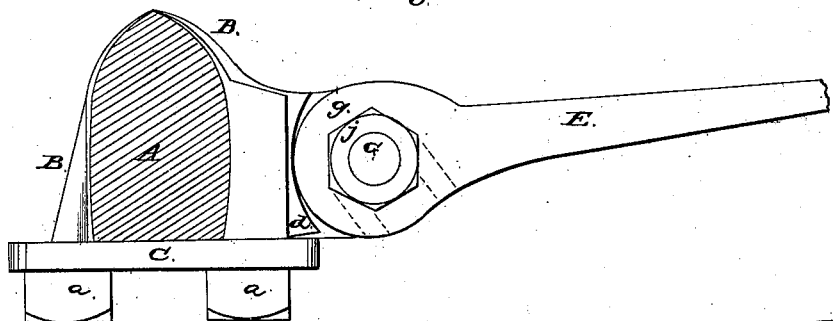
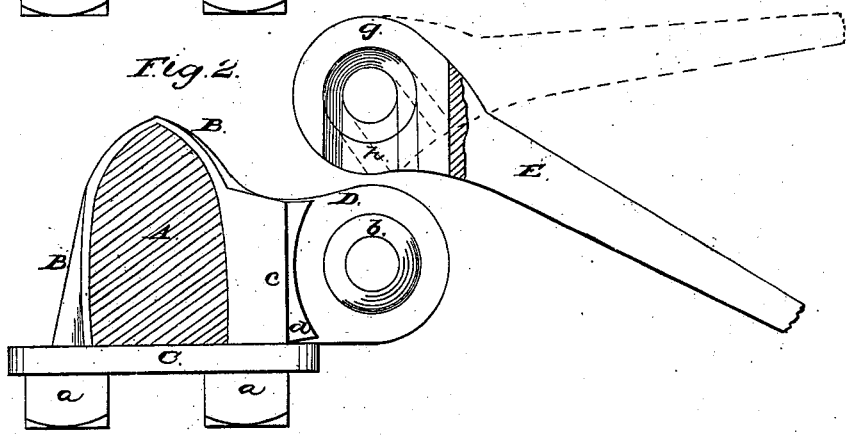
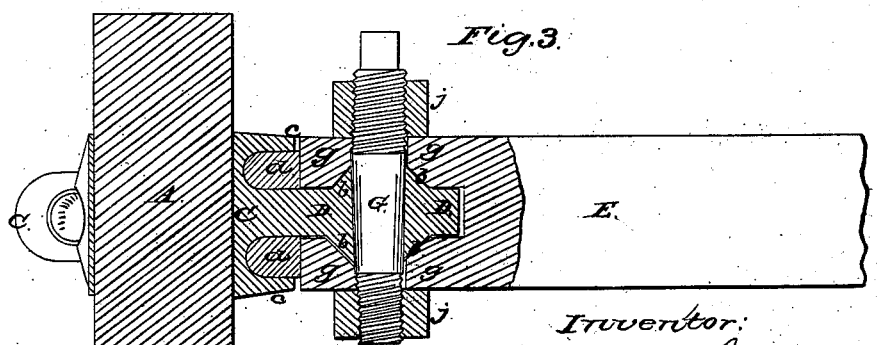

United States Patent Office

GOTTLIEB SCHREYER, OF COLUMBUS, OHIO.

Letters Patent No. 65,017, dated May 21, 1867.

---

IMPROVEMENT IN ATTACHING CARRIAGE-THILLLS.

---

The Schedule referred to in these Letters Patent and making part of the same.

---

TO ALL WHOM IT MAY CONCERN:

Be it known that I, GOTTLIEB SCHREYER, of Columbus, in the county of Franklin, and State of Ohio, have invented a new and improved Thill-Coupling; and I do hereby declare that the following is a full, clear, and exact description thereof, reference being had to the accompanying drawings, making a part of this specification, in which—

Figure 1 is a side view of the improved coupling complete.

Figure 2 is a view showing a thill-iron partly in section detached from the clip.

Figure 3 is a horizontal section through the joint or coupling.

Similar letters of reference indicate corresponding parts in the several figures.

This invention relates to a new and improved joint, which is especially designed for the attachment of thills to the axles of vehicles, but which may be employed wherever a safe and strong joint is required.

This invention provides for attaching thills to axles in such manner that the former can only be detached when unhitched from the horse and depressed to a certain position; also for tightening the joints when they become considerably worn; also for preventing the joints from rattling should they be allowed to become loose; all as will be hereinafter described.

To enable others skilled in the art to understand my invention, I will describe its construction and operation.

In the accompanying drawings, A represents a portion of the axle-tree of a vehicle, B is a clip, which embraces the axle and is secured firmly to it by means of the bottom cross-strap C and nuts $a\,a$, in the usual manner. On the outer vertical side of the clip-strap B, a semicircular lug, D, is formed, through which an eye is made transversely, and on each vertical face of this lug a conical enlargement or boss, $b$, is formed concentric with the eye through the lug. These conical bosses may be formed on the ends of a tube or perforated plug, and this plug inserted through the lug D, and firmly secured to it by shrinking or otherwise. On each side of the lug D a vertical recess is formed by turning up the lips $c\,c$ of the clip-strap, for the purpose of receiving and keeping in place India rubber or other elastic substance, as shown at $d$, in the drawings. The thill-iron E is constructed with a semicircular enlargement on its rear end, which is slotted longitudinally and vertically, thus forming the two ears $g\,g$. Between these ears the lug D fits snugly, but not too tight. Recesses are made in the inside faces of the ears $g\,g$, corresponding in shape and size to the conical bosses $b\,b$ on the sides of the lug D; and in order to insert the lug between the said ears grooves $h$ are made in them, as shown in fig. 2. The grooves $h$ are made at such an angle with respect to the thill-iron E, that it will be necessary to bring the latter to the inclined position shown in fig. 2 in full lines, before the connection can be made, consequently when the thill-iron is in the position shown in fig. 1, it cannot be lifted from the lug C nor become detached. This will prevent a casual detachment of the thills when a horse is hitched to them. A bolt, G, is passed through the ears $g\,g$ and lug C, for the purpose of strengthening the joint and also for the purpose of keeping it tight. This bolt is made tapering, as shown in fig. 3, and the holes through which it passes correspond in shape and size to it. That portion of the bolt or coupling-pin G which is within the lug C is smooth, but those portions which pass through the ears $g\,g$ have threads cut on them for receiving the nuts $j\,j'$. By loosening the nut $j$ and tightening the nut $j'$ the bolt will be drawn tightly in the lug C, and thus prevent looseness of the joint. When the joint becomes loose after long use it can be again tightened by adjusting the bolt as aforesaid. This tranverse bolt is employed as a means for strengthening the coupling as well as for keeping the joint tight, and should this bolt from any cause drop out, the conical bosses on the lug C will prevent the thills from uncoupling. The bosses on lug C are designed for affording sufficient strength to the lug to admit of the use of a very small bolt, thereby requiring the removal of less metal from the lug for the reception of the bolt. Under the old plan of attaching thills to axles by means of bolts, the strain was upon these bolts entirely, and consequently they had to be made large and very strong. This required the holes for their reception to be made so large as to weaken the joints. By my improved coupling I am enabled to make a neat and compact joint, possessing great strength and security. The India-rubber blocks $d\,d$ are forcibly compressed in their respective recesses, so as to press upon the ears $g\,g$ of the thill-iron, and thus render the joint tight, so that it will not rattle. These India-rubber blocks may be dispensed with if the bolt G is set up when it wears loose.

I am aware that it is not new to employ conical bearings in conjunction with adjustable jaws for the purpose of dispensing with bolts and admitting of the tightening up of joints when worn loose, and this I do not claim as my invention.

Having described my invention, what I claim as new, and desire to secure by Letters Patent, is—

1. The construction upon a clip-strap, B, of a perforated lug, D, with conical enlargements $b\,b$ on its sides, adapted for receiving the slotted thill-iron E, and a bolt, G, substantially as described.

2. The construction of the clip-strap B, with lips $c\,c$, for holding rubber-blocks $d\,d$, and also with a perforated lug, D, having conical enlargements upon it, substantially as described and for the purpose set forth.

3. The combination of the slotted thill-iron E, conical lug D, and a tapering bolt, G, substantially as described.

GOTTLIEB SCHREYER.

Witnesses:
 WM. JAMISON,
 W. WILLSHIRE RILEY.